United States Patent
Bryant et al.

[11] Patent Number: 6,078,956
[45] Date of Patent: Jun. 20, 2000

[54] WORLD WIDE WEB END USER RESPONSE TIME MONITOR

[75] Inventors: Raymond Morris Bryant; Richard Dale Hoffman, both of Austin, Tex.; Samuel Kahn, Mountain View, Calif.

[73] Assignee: International Business Machines Corporation, Armonk, N.Y.

[21] Appl. No.: 08/924,986

[22] Filed: Sep. 8, 1997

[51] Int. Cl.$^7$ .............................. G06F 13/38; G06F 17/30
[52] U.S. Cl. .......................... 709/224; 709/227; 709/203
[58] Field of Search .................................. 709/224, 200, 709/203, 202, 212, 217, 219, 218, 227; 707/500, 513

[56] References Cited

U.S. PATENT DOCUMENTS

| | | | |
|---|---|---|---|
| 5,440,719 | 8/1995 | Hanes et al. | 395/500 |
| 5,572,643 | 11/1996 | Judson | 709/218 |
| 5,675,796 | 10/1997 | Hodges et al. | 709/101 |
| 5,764,912 | 6/1998 | Rosborough | 709/224 |
| 5,787,254 | 7/1998 | Maddalozzo, Jr. et al. | 709/228 |
| 5,790,425 | 8/1998 | Wagle | 709/218 |
| 5,790,977 | 8/1998 | Ezekiel | 709/218 |
| 5,796,952 | 8/1998 | Davis et al. | 709/224 |
| 5,805,815 | 9/1998 | Hill | 709/218 |
| 5,838,920 | 11/1998 | Rosborough | 709/224 |
| 5,872,976 | 2/1999 | Yee et al. | 395/704 |

OTHER PUBLICATIONS

Sullivan, Eamonn; "HTTP eases access to Internet info."; PC Week, Ziff–Davis Publishing Company; v11, n4, p71(2), Jan. 1994.

McLachlan, Gordon; "A look at SGML"; HP Professional, Cardinal Business Media Inc.; v9, n6, p48(2), Jun. 1995.

Giacone, Glynn B.; "Seek and fine–tune: Getting the most from client–server transactions"; Data Based Advisor, Data Based Solutions Inc.; v14, n9, p76(7), Sep. 1996.

*Primary Examiner*—Mark H. Rinehart
*Assistant Examiner*—Marc D Thompson
*Attorney, Agent, or Firm*—Jeffrey S. LaBaw; David H. Judson

[57] ABSTRACT

A method of logging information in a computer network having a Web client connectable to a Web server. In response to the HTTP request (and as a result of receiving a response to that request), a response time associated with that first HTTP request is calculated. Thereafter, the response time calculated is passed from the Web client on a subsequent HTTP request to that Web server, where the information is logged for later use. In a preferred embodiment, the response time associated with the first HTTP request is passed in a cookie of the second HTTP request.

18 Claims, 3 Drawing Sheets

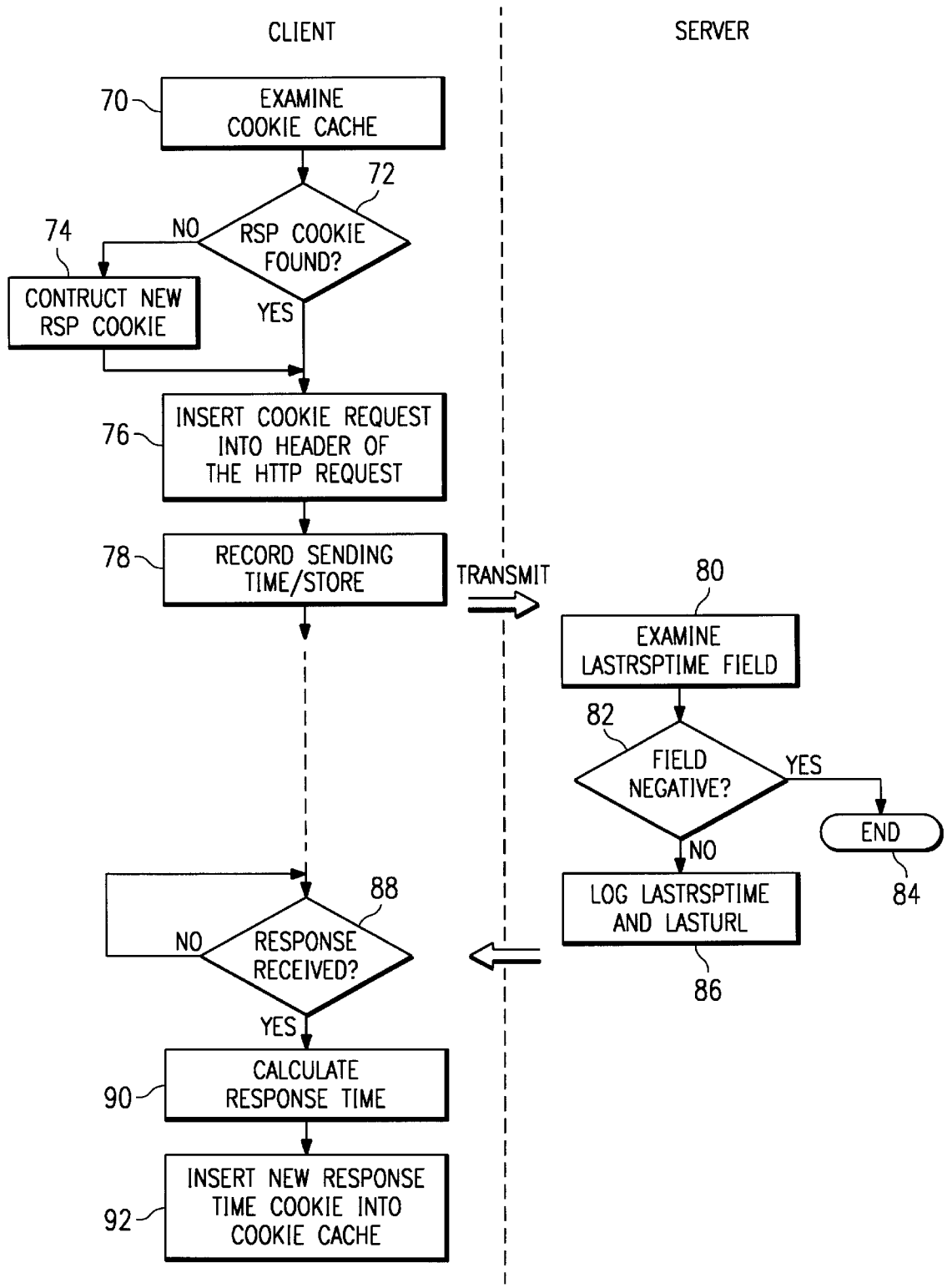

WORLD WIDE WEB END USER RESPONSE TIME MONITOR

BACKGROUND OF THE INVENTION

1. Technical Field

The present invention relates generally to computer networks and more particularly to a method and system for monitoring and collecting data in a client-server computer network such as the Internet.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

The time period between the issuing of an HTTP request from the browser and the return of the requested document (or some component thereof) is known as the end user "response time." The response time is a function of the time spent servicing the HTTP request at the Web server together with the network transmission time to and from the server. The network transmission time is sometimes referred to herein as the "Internet delay."

Response times could be measured in environments where the clocks of the client and server machines are synchronized or where an external time reference is available to both the client and the server. Given the diverse nature of the Internet environment, however, such solutions are impractical because these criteria could not be met for all of the clients of a large web server. One possible alternative would be to place a special client (a so-called "transaction monitor") on the Internet and have the transaction monitor periodically issue a request to the server of interest. The transaction monitor would have to be built with response time instrumentation applied. Measured response times for this client would then be presumed to be indicative of response times that actual clients encountered. Such an approach also has significant drawbacks. The transaction monitor would presumably hook into the Internet at a fixed site or ISP (or at most a small number of sites). The response times measured by the transaction monitor would thus represent only a small fraction of the total paths that may be used to connect to a large server. In addition, such a transaction monitor would be useless for resolving questions about the response times for requests issued by way of an ISP that the transaction monitor is not currently using. Further, the transaction monitor would have to be constructed to use test transactions against the server. Test transactions are suspect in that they may omit entire classes of operations, and they can be difficult to create if the mission of the Web server is considered critical or secure (e.g., financial transactions).

There remains a need to provide an end user response time monitor that overcomes these and other problems associated with the known prior art.

SUMMARY OF THE INVENTION

It is thus a primary object of the present invention to measure response times as seen by an end user for requests submitted from a Web browser to a Web server on the World Wide Web.

It is another primary object of this invention to measure end user response times at the Web browser and to submit such data to a Web server for collection.

It is another important object of this invention to implement end user response time monitoring capability without resort to synchronized clocks at the client and server machines, to use of an external time reference, or to implementation of a dedicated transaction monitor.

Another important object of this invention is to measure the response time characteristics of the network, in general, and a given URL, in particular to enable Web site operators to evaluate quality of service.

It is still another important object of this invention to facilitate the collection of response time data and statistics for use by Web site operators.

These and other objects of the invention are achieved by calculating a response time associated with a first HTTP request and then passing that response time information from the Web client to the Web server in a second, subsequent HTTP request. Preferably, the response time information is passed to the Web server in a special cookie called a response time protocol (RSP) cookie.

Thus, in one preferred embodiment of this invention, a method of logging information in a computer network having a Web client connectable to a Web server comprises several steps. The method begins at the Web client in response to a first HTTP request. In response to the HTTP request (and as a result of receiving a response to that request), a response time associated with that first HTTP request is calculated. Thereafter, the response time calculated is passed from the Web client on a subsequent HTTP request to that Web server, where the information is logged for later use (e.g., URL statistical analysis and the like). In a preferred embodiment, the response time associated with the first HTTP request is passed in a cookie of the second HTTP request.

The response time associated with the first HTTP request is calculated without synchronized client and server machine clocks or use of an external timebase. Rather, the end user response time is calculated using just a clock in the Web client. In particular, this calculation begins by recording a first clock time on the clock, the first time associated with the transmission of the first HTTP request from the Web client to the Web server. Upon receipt at the Web client of a specified event in a response to the first HTTP request, a second clock time on the clock is recorded. The response time is then generated by subtracting the first clock time from the second clock time. The specified event in the response to the first HTTP request may be any event in the response, such as first packet return, last HTML byte, last .gif byte, receipt of some intermediate byte or page element, or the like (provided this is done consistently from request to request). Because the "timebase" for the response time calculation is all "local" (i.e. within the Web client itself), any given event may be used as the trigger for the calculation. The calculated response time is saved and then sent to the Web server upon a next HTTP request to that server.

Preferably, the present invention is implemented with a client "piece" and a server "piece." The client software may be a computer program product implemented in a computer-readable medium or otherwise downloaded to the Web client over the computer network. This software includes first program code means, responsive to a first HTTP request from the Web client to the Web server, for calculating the response time associated with the first HTTP request, and second program code means, responsive to the calculating means and a second HTTP request, for placing the response time in a cookie associated with the second HTTP request. The second HTTP request is then sent to the Web server to pass the response time information as previously described.

The server "piece" of the invention is also preferably implemented in software associated with a Web server program running on a Web site that supports the invention. Such a Web site is sometimes referred to herein as an "instrumented" server. The server "piece" includes a first program code means, responsive to receipt of a current HTTP request from the Web client, for retrieving a cookie from the HTTP request. The cookie includes information identifying a response time associated with a prior HTTP request from the Web client to the Web server program. The server piece also includes second program code means responsive to the retrieving means for logging the response time.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 5 is a flowchart illustrating the various operations of the Web client and the Web server in response to a user HTTP request.

DETAILED DESCRIPTION OF THE PREFERRED EMBODIMENT

Figure 1:
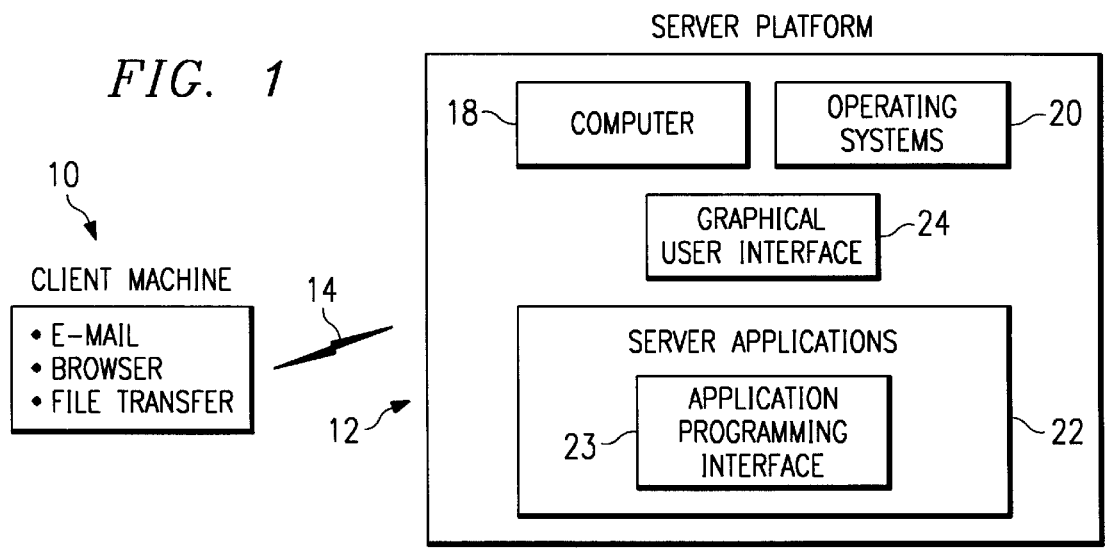
FIG. 1 is a representative system in which the present invention is implemented.

A representative system in which the present invention is implemented is illustrated in FIG. 1. A client machine 10 is connected to a Web server platform 12 via a communication channel 14. For illustrative purposes, channel 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. Representative browsers include, among others, Netscape Navigator (Version 2.0 and higher), Microsoft Internet Explorer (Version 3.0 and higher) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, *RISC System/6000, 7013 and 7016 POWERstation and POWERserver Hardware Technical Reference,* Order No. SA23-2644-00. AIX OS is described in *AIX Operating System Technical Reference,* published by IBM Corporation, First Edition (November 1985), and other publications. While the above platform is useful, any other suitable hardware/operating system/Web server combinations may be used.

Figure 2:
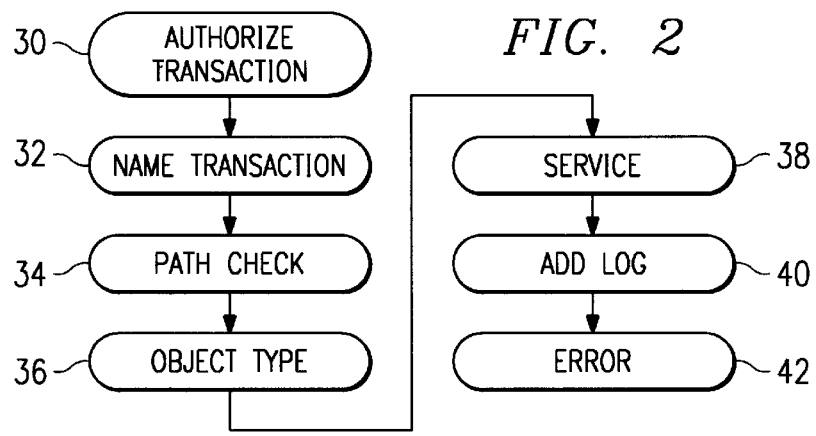
FIG. 2 is a flowchart illustrating the conventional processing associated with an HTTP request from the Web client to the Web server shown in FIG. 1.

The Web Server accepts a client request and returns a response. The operation of the server program 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded. At step 42, called Error, the server responds to the client when it encounters an error. Further details of these operations may be found in the Netscape *Web Server Programmer's Guide,* Chapter 5, which is incorporated herein by reference. The time spent carrying out the various functions of FIG. 2 (namely, the time spent by the Web server serving the HTTP request) is referred to below as the SERVER_PROCESSING_TIME.

Thus, the Web server 18 includes a known set of server application functions (SAFs). These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plugins."

Figure 3:
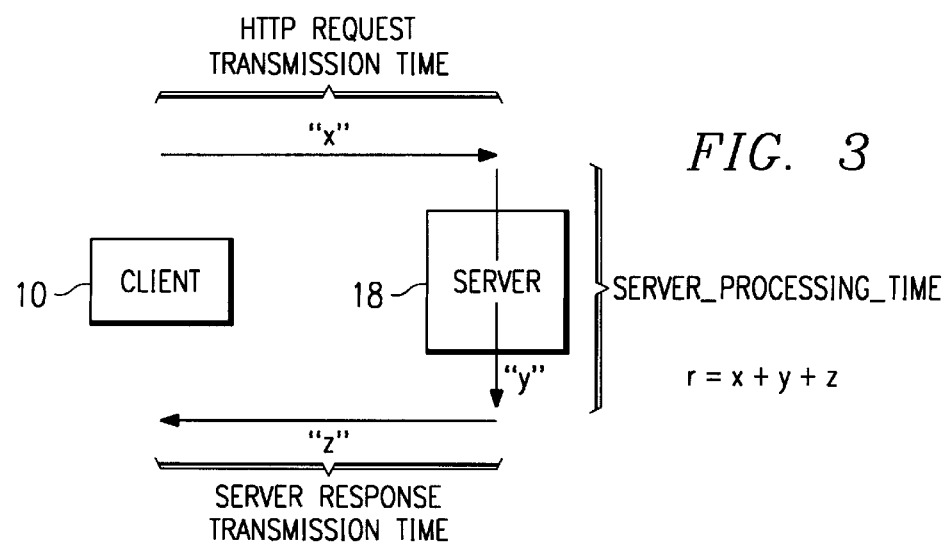
FIG. 3 is a simplified timing diagram illustrating how end user response time is calculated.

FIG. 3 illustrates the various components that comprise the "response time" of a given HTTP request. A first time "x" represents the time to transfer the HTTP request (usually a GET or POST request) from the Web client to the Web server. A second time "y" represents the server processing time (SERVER_PROCESSING_TIME), which was described above with respect to the flowchart of FIG. 2. A third time "z" then represents the time to transfer a specified event in the response to the HTTP request back to the Web client. The specified event may be first packet return, last HTML byte, last .gif byte, or some intermediate event within the transfer. Thus, the response time "r" equals "x+y+z." The "Internet delay," which is that portion of the response time associated with the actual transmission over the Internet itself (as opposed to the time spent within the server for processing), is then the value "x+z". The present invention provides a technique for calculating response time associated with a given HTTP request and then recording or logging that response time at the Web server for subsequent analysis and use.

Figure 4:
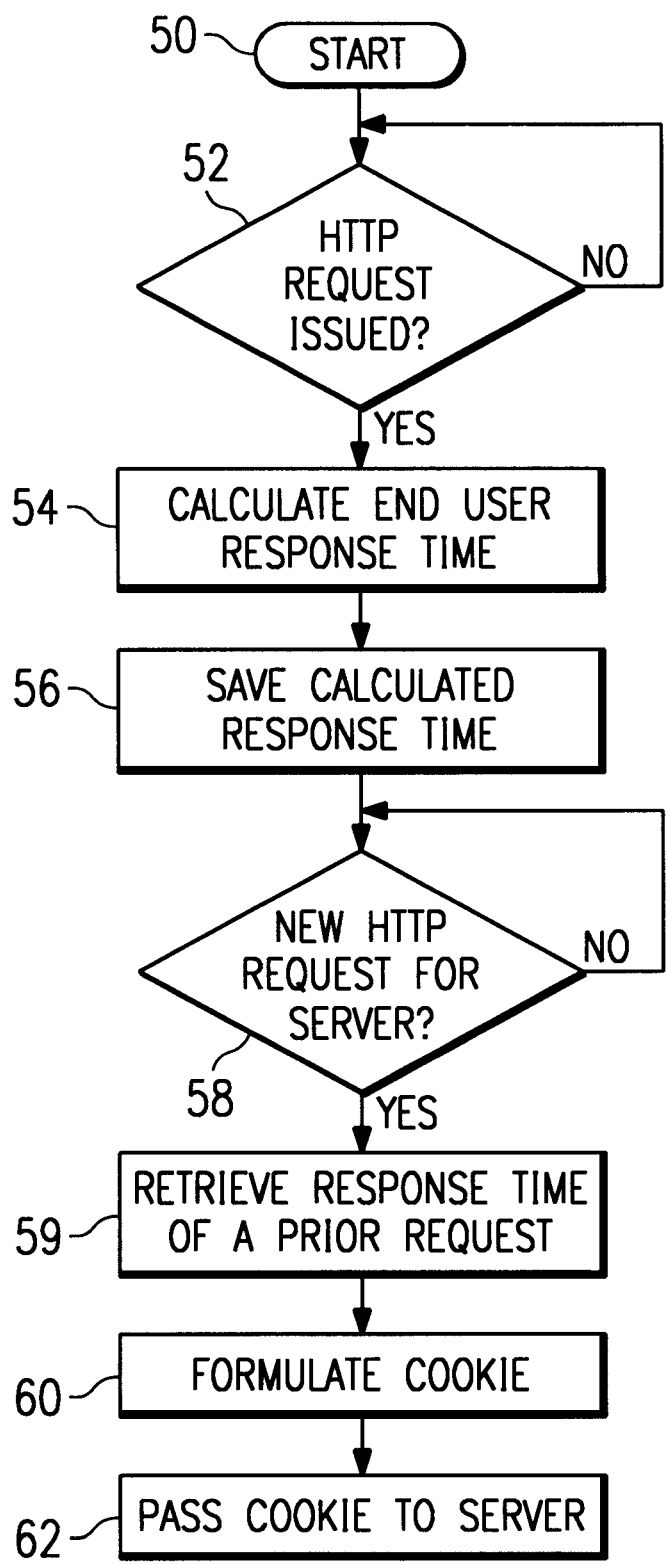
FIG. 4 is a flowchart illustrating the basic operation of the present invention.

A preferred embodiment of the inventive method is illustrated in the simplified flowchart of FIG. 4. The method begins at step 50. At step 52, a test is run repeatedly to determine whether a given HTTP request (e.g., a GET or POST) has been issued from the client to a given server. If the outcome of the test at step 52 is positive, the routine continues at step 54 to calculate the response time "x+y+z." A preferred technique for performing this calculation is described below. At step 56, the calculated response time is saved at the client. A test is then run at step 58 to determine if a new HTTP request for the given server. If the result of the test at step 58 is negative, the routine cycles and repeatedly tests for this condition. If, however, the result of the test at step 58 is positive, the routine continues at step 59 to retrieve the end user response time calculated at step 54 (which will usually be the response time associated with the most-recent visit to the server), and formulates a response time protocol (RSP) cookie at step 60. At step 62, the cookie is then passed to the Web server, preferably within the new HTTP request itself. This completes the basic processing.

Thus, in accordance with the preferred embodiment, a response time associated with a first HTTP request is calculated as the HTTP request is being processed but not passed to the Web server until a subsequent HTTP request (typically, a next request). Preferably, the response time information is passed to the Web server in a special cookie associated with the subsequent HTTP request. A more detailed description of this process is now provided.

In a preferred embodiment, a special "response time cookie" (herein referred to as the "RSP cookie") is associated with the Web client browser and processed by the Web server. The RSP cookie comprises the following two fields of data (and possibly others, as will be described):

LASTRSPTIME the response time of the last request; and
LASTURL the URL of the last request The particular format of LASTRSPTIME is not significant; however, for this example, it is assumed to be an integer representing the number of milliseconds required for the response. Web servers are divided into two classes: instrumented and non-instrumented. Instrumented servers are servers that implement the RSP cookie protocol. It is presumed that there is some mechanism used to inform the browser as to whether or not a particular server is an instrumented server. The default is for a Web server to be non-instrumented. Web client browsers that support the RSP cookie protocol are called instrumented browsers. For the rest of this discussion, it is assumed that the HTTP request originates from an instrumented browser.

The protocol then operates as follows. Whenever an instrumented server is contacted, the browser examines the cookie cache looking for a RSP cookie for that server. This is step 70. A test is then made at step 72 to determine if an RSP cookie is found. If no RSP cookie is found, the routine continues at step 74 with the browser constructing a new RSP cookie for that server by initializing LASTRSPTIME to −1 and LASTURL to null. If an RSP cookie is found (i.e. the output of the test at step 72 is positive), or after step 74, the browser includes the current contents of the RSP cookie for that server by inserting a "Cookie:" request into the header of the HTTP request and filling in the values for LASTRSPTIME and LASTURL from the cookie cache. This is step 76. At step 78, the browser records the time when the request is sent according to the time clock on the client system where the browser is running and stores this value in storage local to the browser (or in some other way accessible to the browser).

The routine then continues with the server processing. In particular, when the cookie (associated with the HTTP request) is received, the routine continues at step 80 and examines the LASTRSPTIME field. A test is then made at step 82 to determine if this field is negative. If so, the server processing ends, as indicated by step 84. If the outcome of the test at step 82 indicates that the LASTRSPTIME field is non-negative, the routine continues at step 86 with the server logging the LASTRSPTIME field and the LASTURL and any other information from the request the server might find appropriate (e.g. the domain name of the requester). To minimize the total amount of data collected, the server may choose to randomly sample the recorded response times and log only a subset of the times. Postmortem analysis tools would then examine the response time log and produce response time statistics per URL.

Processing then continues back at the client. In particular, at step 88, at test is made to determine whether a response has been received from an instrumented server. If the outcome of the test at step 88 is negative, the step cycles and continues to test. If, however, the outcome of the test at step 88 indicates that a response to the HTTP request is received from an instrumented server, the routine continues at step 90. In this step, the browser subtracts from the current client clock time the time that the request was sent. This time, as well as the "referring URL," are recorded in the RSP cookie for that server at step 92. This completes the processing.

It should be noted that when the cookie cache is searched for a RSP cookie, the normal path matching of the Netscape cookie protocol is disabled. Equivalently, all RSP cookies are preferably stored with a path of "/". The effect of this is that the RSP cookie is sent as part of every request to an instrumented server. There is potentially a separate RSP cookie for each instrumented server that the Web browser has contacted, subject to the limits of storage on the client machine. Well known methods, such as expiration dates, can be used to discard RSP cookies when they are likely to no longer be useful. A discarded RSP cookie means that a response time observation has been lost. Since RSP time statistics are likely to be sampled by the Web server in any case, however, the loss of a response time observation due to this event is not considered harmful.

This method does not return the response time of the last interaction the browser has with a server during a particular session since the response time of the previous interaction is always sent out with the next request. However, if sufficient space is available on the browser system, and if the RSP cookie is not discarded before the next time that the browser visits the instrumented server, the response time of the last request of the previous session may be presented to the server as part of the first request of the new session.

Naming conventions for the RSP Cookie fields LASTRSPTIME and LASTURL may vary depending on the conventions observed by the Web server. For example, to communicate these values to a server-side JavaScript program running on a Netscape Enterprise server, these fields could be named (respectively):
NETSCAPE_LIVEWIRE.LASTRSPTIME
NETSCAPE_LIVEWIRE.LASTURL As also noted above, the present invention uses a special "cookie." Those of ordinary skill in the art will appreciate that this RSP cookie is a variant of the persistent client state HTTP cookie normally used to facilitate authentication of a user connecting to an enabled web site. Cookies are a known Internet mechanism which server-side connections (such as CGI scripts) can use to both store and retrieve information on the client side of the connection. A server, when returning an HTTP object to a client, may also send a piece of state information which the client will store. Typically, the state object, called a "cookie," may include a description of the range of URLs for which that state is valid. According to the *Persistent Client State HTTP Cookies* Preliminary Specification, which is hereby incorporated by reference and may be viewed at netscape.com at the path "/newref/std/cookie_spec_html," a cookie is introduced to the client by including a Set-Cookie header as part of an HTTP response, usually through a CGI script.

It should be appreciated that the "response time" is not necessarily the time between the initiation of the HTTP request at the client and the first or last packet return associated with the target document. This invention could also be used to record and collect intermediate response times such as: response time of first data arrival, response time HTML delivery complete, response time of all gift's delivered, or some other intermediate response time. If the domain name of the requester is logged as part of the server log record, one could also use this tool to determine whether poor response times are due to a particular ISP or other route into the server.

This invention solves the problem of measuring response times as seen by the end user for requests submitted from a Web browser to a Web server on the World Wide Web. The invention is suitable for use in a production environment where users submit requests over the Internet either by direct connection or by connection through an Internet Service Provider over dial up lines. Response times are measured by the Web browser and submitted to the Web server for collection.

According to the invention, it may be desirable to implement the end user response time monitor using client and server side JavaScript. Familiarity with basic JavaScript programming conventions is assumed in the following discussion.

As discussed above, one aspect of the present invention involves making a local timestamp when a request is made to the Web server. This operation may be performed using a simple "javascript" URL. For example, consider the following conventional anchor and link:

<A HREF=http://www.bigbank.url">click here, big spender</A>.

The above statement is modified as follows:

<A HREF="javascript:rspmon('http://www.bigbank.url')">click here, big spender</A>, where the function rspmon is a client-side JavaScript function defined as follows:

```
function rspmon(url) {
document.cookie = "NETSCAPE_LIVEWIRE.curr_time="
    +(new Date()).getTime()+";";
    window.location = url;
    }
```

The first line of this function records the current clock time in the cookie so that this value will be available as part of the "client" object in the server side JavaScript. The second line of the function causes the link to be followed. This function is then included on every page that includes a javascript:rspmon() URL. To properly measure the response time for accessing URL foo, all URL's referencing foo are changed to javascript:rspmon(foo)".

In this example, when the user clicks on the "click here, big spender" link, the rspmon() function is invoked. The function records the current client system clock time and causes the link to be followed. When the request is sent up to the server, the cookie values are sent along with the request so the server now has the client submission time given in milliseconds since Jan. 1, 1970 (which is the date that getTime() returns) according to the client system's clock value.

To calculate the response time necessary to serve up "www.bigbank.url", the following code is included in the server-side JavaScript for that URL:

```
<server>
client.rsp_time_set = "RSP_TIME_NOT SET";
client.rsp_time_trace_id = ifs_trace_id() + trans_count();
if      (client.curr_time > 0) {
        write ("<SCRIPT>");
        write ("if (document.cookie.indexOf(\"RSP_TIME_NOT_
            SET\") !=-1) {");
            write ("document.cookie =
            \"NETSCAPE_LIVEWIRE.last_rsp_time=\"+
                (new Date()).getTime() -"+client.curr_time+";");
            write ("document.cookie=\"'NETSCAPE_LIVE-
            WIRE.rsp_time_set=
                RSP_TIME_SET,\";
            write ("document.cookie = \"NETSCAPE_LIVE-
            WIRE.curr_time=-1,");
            write ("}");
            write ("</SCRIPT>");
        }
</server>
```

The above code is included so that the client-side JavaScript it emits is included in the "onload" event handler action for the page. The first statement sets a flag in the cookie to make sure that last_rsp_time is updated on the client only on the first time that the onload action for the page is executed. (The onload action is executed each time the page is reloaded or resized). The second statement sets a value in the cookie (here set by some pseudocode) that includes trace information to allow correlation of this response time with other log records related to this request. The if_trace_id variable is intended to return the current IFS trace id; the trans_count is intended to return a count of transactions during the session.

If NETSCAPE_LIVEWIRE.curr_time on the client was set to 987666532, then the rest of the statements in the <server> code above cause the following client-side JavaScript to be submitted to the client as part of the page.

```
<SCRIPT>
if (document.cookie.indexOf("RSP_TIME_NOT_SET") != -1) {
document.cookie = "NETSCAPE_LIVEWIRE.last_rsp_time+(new Date()).getTime()
    -987666532;
document.cookie = "NETSCAPE_LIVEWIRE.rsp_time_set= RSP_TIME_SET;";
document.cookie = "NETSCAPE_LIVEWIRE.curr.time=-1;
    }
</SCRIPT >
```

The if statement ensures that last_rsp_time is updated only the first time that the "onload" action is invoked. The last_rsp time contains the time in milliseconds required to service this request and deliver the page to the client.

To collect response time data, code is added on the server that inspects the client object properties last_rsp time and rsp_time_set. If rsp_time_set has the value RSP_TIME_SET, then client.last_rsp_time and client.rsp_time_trace_id are logged. Client.rsp_time_set is then set to RSP_TIME_NOT_SET (on the server). The latter operation is done to avoid logging the same response time more than once and to deal with mixtures of instrumented and non-instrumented pages.

Thus, in this approach, each URL specifying the target page is a JavaScript URL of the form javascript:rspmon(), and each client page includes the rspmon() function as described above. Target page instrumentation includes the server-side JavaScript that outputs the onload action to record the last_rsp_time and update resp_time_set in the cookie.

A more complete Javascript implementation is set forth below:

```
<html>
<head>
<title>Response Monitor Client Test Page</title>
</head>
<SCRIPT LANGUAGE="JavaScript">
//
// this is PSEUDO code
// there is no GLOBAL cookie in current JavaScript
// what is needed is to insert a cookie into the cookie cache
// with "path=/". At present, cookies are inserted with
// "path=current_url" via way of the document.cookie attribute
//
// the GLOBAL attribute is needed to make sure the cookie is
// sent to the server regardless of the target url
//
function rspmon (url) {
    var now = new Date ();
    //
    // use the GLOBAL cookie (assumed js extension) see above
    //
    GLOBAL.cookie =
    "NETSCAPE_LIVEWIRE.currtime="+now.getTime()+";";
    GLOBAL.cookie = "NETSCAPE_LIVEWIRE.currurl ="+url+";";
    window.location = url;
}
//
// It is assumed the default action of the server is to return
// all global cookies back to the client on the next request so
// that no action is required on the server side for this request
//
</SCRIPT>
<center>
[End User Response Time Monitor Sample Client Page]
```

```
</center>
<BR><BR><BR>
<BR><BR>
<BR><BR><BR><BR>
[ <A HREF="index.html">Home Page </A> |
<A
HREF="javascript:rspmon
('http://www.webserver.example.com/rspmontarget') ">Test</A>
</body>
</html>
</html>
<head>
<title>Test response time monitor target page</title>
</head>
<body>
<center>
[This page is a response time monitor target page]
<BR><BR><BR>
<SCRIPT>
//
// this is PSEUDO code
// there is no GLOBAL cookie in current JavaScript
// what is needed is to insert a cookie into the cookie cache
// with "path=/". At present, cookies are inserted with
// "path=current_url" via way of the document.cookie attribute
//
// the GLOBAL attribute is needed to make sure the cookie is
// sent to the server regardless of the target url
//
//
// code based on sample code in Netscape JavaScript Reference
//
function getCookie(Name) {
    var search  = "NETSCAPE_LIVEWIRE."+Name+"=";
    var RetStr  = "";
    var offset  = 0;
    var end     = 0;
    if (GLOBAL.cookie.length > 0) {
        offset = GLOBAL.cookie.indexOf (search);
        if ( offset != -1) {
            offset += search.length;
            end = GLOBAL.cookie.indexOf(";",offset);
            if (end == -1) end = document.cookie.length;
            //
            // Note well: It is assumed here that there are
            no
            // special characters in the value!
            //
            RetStr = GLOBAL.cookie.substring(offset,end);
        }
    }
    // document.write("<P>At return. . .RetStr="+RetStr+"\n");
    return(RetStr);
}
//
// code based on sample code in Netscape JavaScript Reference
//
function setCookie(Name, Value) {
    //
    // Note well: no special characters are allowed in the
    value!
    //
    GLOBAL.cookie = "NETSCAPE_LIVEWIRE."+Name+"="
    +Value+";";
}
function expireCookie(Name) {
    //
    // make this name disappear from the cookie
    //
    var now = new Date ();
    // choose an expiration date 10 seconds in the past
    now.setTime(now.getTime() - 10000);
    GLOBAL.cookie = "NETSCAPE_LIVEWIRE."+Name+
    "=EXPIRED;
    expires="+
        now.toGMTString();
}
//
// calculate the response time of the last request based on the
```

-continued

```
// cookie values sent up the the server at that time
//
function updateRspTime() {
    currtime = getCookie("currtime");
    //
    // did we get a currtime sent to us in the cookie from the
    server
    //
    if (currtime != "") {
        //
        // we do this to keep the cookie from getting cluttered
        //
        expireCookie ("lastrsptime");
        expireCookie ("lasturl");
        var now = new Date();
        setCookie ("lastrsptime",now.getTime() -currtime);
        //
        // get the url of the last request -- it was put in
        // the cookie as currurl when the last request was sent
        //
        setCookie ("lasturl",getCookie ("currurl"));
    }
    //
    // we clear currtime here so that we won't recalculate the
    lastrsptime
    // if the page gets reloaded before a new request is made of
    the server
    //
    expireCookie ("currtime");
    expireCookie ("currurl");
}
//
// It is assumed the default action of the server is to return
// all global cookies back to the client on the next request so
// that no action is required on the server side for this request
//
</SCRIPT>
</SCRIPT>
//
// since this is response time monitor target page,
// the cookie contains the currtime and currurl from
// the last request. we can use these to calculate
// the response time of the last request.
//
// go do that now
//
updateRspTime();
</SCRIPT>
<BR><BR><BR><BR>
[ <A HREF="index.html">Home Page</A> |
<A
HREF="http://www.webserver.example.com/rspmonfinal"
>Final Page</A>
]
</body>
</html>
</html>
<head>
<title>Response Time Monitor Final Page</title>
</head>
<body>
<center>
[This page includes the code required to log a response time]
<BR><BR><BR>
<SERVER>
logfile = new
File ("/usr/ns-home/LiveWire/samples/testjst/rsptime.log");
now = new Date();
logfile.writeln("now="+now+". . ."+client.lastrsptime+"
url:"+client.lasturl);
logfile.close();
</SERVER>
</body>
</html>
```

One of the preferred implementations of the scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file.

The inventive concept of using a second, subsequent HTTP request (and preferably a cookie associated therewith) as the "vehicle" for transporting information about a first, prior HTTP request may be used for other purposes as well as response time monitoring. Thus, it may be desirable to record information about other client activities (for example, relative to the first HTTP request, or some other client or browser action) and then use another HTTP request as the means by which that information is then delivered back to the server. Thus, the present invention should be broadly construed as covering any method of logging information in a computer network having a Web client connectable to a Web server wherein a cookie (in a current interaction) is used to transmit information about a previous client-server interaction.

One of ordinary skill will also recognize that the inventive features of the present invention may be applied to other Internet services as well as to an HTTP-compliant browser. Thus, the invention may be useful in monitoring response time associated with the sending or retrieval of e-mail (via the simple mail transfer protocol, or SMTP), associated with a file transfer (via the file transfer protocol, or FTP), associated with the posting to a bulletin board (via the network news transfer protocol, or NNTP), or associated with remote terminal access (Telnet).

Having thus described our invention, what we claim as new and desire to secure by Letters Patent is set forth in the following claims.

We claim:

1. A method of logging information in a computer network having a Web client connectable to a Web server, comprising the steps of:
    calculating a response time associated with a first HTTP request from the Web client to the Web server; and
    passing the response time associated with the first HTTP request using a second HTTP request from the Web client to the Web server;
    wherein the second HTTP request includes a response time protocol cookie in which the response time associated with the first HTTP request is passed.

2. The method as described in claim 1 further including the step of recording the response time associated with the first HTTP request.

3. The method as described in claim 1 wherein the second HTTP request is subsequent to the first HTTP request.

4. The method as described in claim 1 wherein the response time associated with the first HTTP request is calculated using a clock in the Web client.

5. The method as described in claim 4 wherein the response time calculation includes the steps of:

recording a first clock time on the clock, the first time associated with the transmission of the first HTTP request from the Web client to the Web server;

determining a second clock time on the clock, the second time associated with receipt at the Web client of a specified event in a response to the first HTTP request; and subtracting the first clock time from the second clock time to generate the response time.

6. The method as described in claim 5 wherein the specified event is selected from the group of specified events associated with processing of the response, the group of specified events consisting of: first packet return, last HTML byte, last .gif byte and intermediate response events.

7. A method of logging information in a computer network having a Web client connectable to a Web server, comprising the steps of:

at the Web client, calculating a response time associated with a first HTTP request from the Web client to the Web server;

passing the response time associated with the first HTTP request in a response time protocol cookie of a second HTTP request from the Web client to the Web server; and at the Web server, recording the response time associated with the first HTTP request.

8. The method as described in claim 7 wherein the second HTTP request is subsequent to the first HTTP request.

9. The method as described in claim 7 wherein the response time associated with the first HTTP request is calculated using a clock in the Web client.

10. The method as described in claim 9 wherein the response time calculation includes the steps of:

recording a first clock time on the clock, the first time associated with the transmission of the first HTTP request from the Web client to the Web server;

determining a second clock time on the clock, the second time associated with receipt at the Web client of a specified event in a response to the first HTTP request; and subtracting the first clock time from the second clock time to generate the response time.

11. The method as described in claim 10 wherein the specified event is selected from the group of specified events consisting of: first packet return, last HTML byte and last .gif byte.

12. A computer program product in a computer-readable medium for monitoring response time in a Web client connectable to a Web server in a computer network, comprising:

first program code means, responsive to a first HTTP request from the Web client to the Web server, for calculating a response time associated with the first HTTP request; and second program code means, responsive to the calculating means and a second HTTP request, for placing the response time in a response time protocol cookie associated with the second HTTP request.

13. The computer program product as described in claim 12 wherein the Web client includes a clock and the calculating means comprises:

means for recording a first clock time on the clock, the first time associated with the transmission of the first HTTP request from the Web client to the Web server;

means for determining a second clock time on the clock, the second time associated with receipt at the Web client of a specified event in a response to the first HTTP request; and means for subtracting the first clock time from the second clock time to generate the response time.

14. A computer for use as a server in a computer network having a Web client connectable to the computer, comprising:

a processor;

an operating system;

a Web server program;

first program code means responsive to receipt of a current HTTP request from the Web client for retrieving from the HTTP request a response time protocol cookie, the response time protocol cookie including information identifying a response time associated with a prior HTTP request from the Web client to the Web server program; and second program code means for logging the response time.

15. A method of logging information in a computer network having a Web client connectable to a Web server, comprising the steps of:

calculating information associated with a first HTTP request from the Web client to the Web server; and passing the calculated information in a response time protocol cookie of a second HTTP request from the Web client to the Web server.

16. The method as described in claim 15 wherein the information is a response time of the first HTTP request.

17. A method of logging information in a computer network having a client connectable to a server, comprising the steps of:

calculating a response time associated with a first transfer protocol request from the client to the server; and passing the response time associated with the first transfer protocol request using a second transfer protocol request from the client to the server;

wherein the second transfer protocol request includes a response time protocol cookie in which the response time associated with the first transfer protocol request is passed.

18. The method as described in claim 17 wherein the transfer protocol is selected from the group of transfer protocols consisting of HTTP, SMTP, FTP, NMTP and Telnet.

* * * * *